United States Patent Office 3,323,596
Patented June 6, 1967

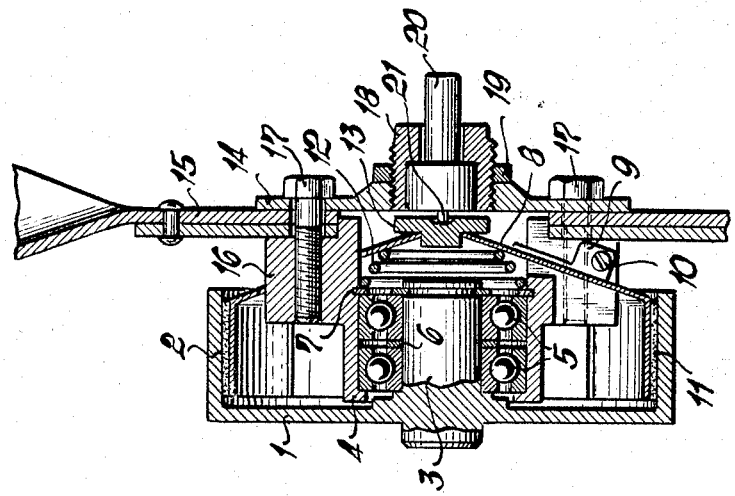

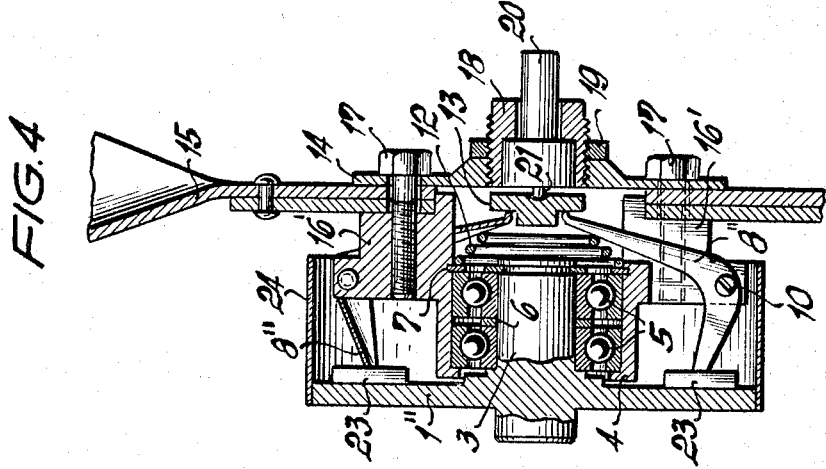
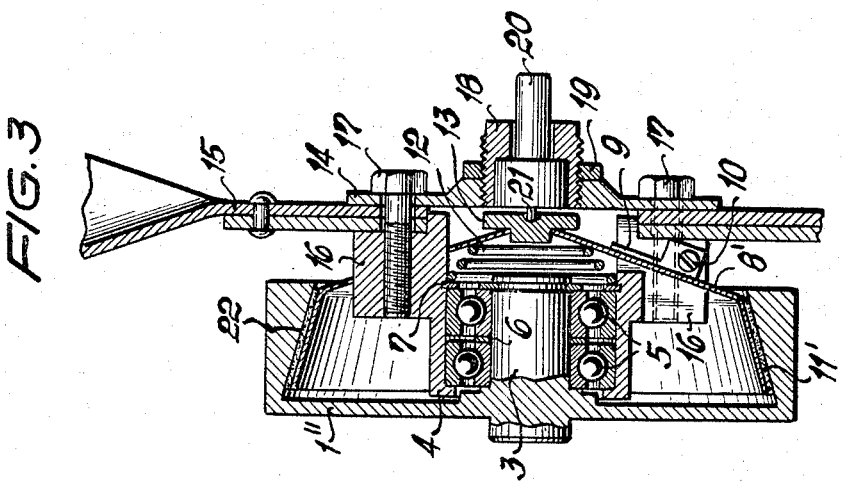

3,323,596
TEMPERATURE RESPONSIVE CLUTCH FOR AN ENGINE-COOLING FAN AND THE LIKE
Siegfried Möbius, Schweinfurt am Main, Germany, assignor to Fichtel & Sachs A.G., Schweinfurt am Main, Germany, a corporation of Germany
Filed June 14, 1965, Ser. No. 463,498
Claims priority, application Germany, June 18, 1964, F 43,202
12 Claims. (Cl. 170—135.75)

This invention relates to automotive cooling systems, and particularly to a temperature responsive clutch for connecting the cooling fan of an internal combustion engine to the engine shaft, and to a fan arrangement including such a clutch.

It is known to drive the cooling fan of an internal combustion engine through a clutch which responds to ambient temperature in such a manner as to selectively connect the fan to the engine drive shaft above a predetermined temperature.

The fan operates at relatively high speed and is exposed to solid particles carried by the air stream which is blown by the fan against a radiator in liquid-cooled engines or against cooling fins on the cylinders of an air-cooled engine. The space available for the clutch is limited, and the thermostatic element which controls the clutch therefor must be mounted on the rotating clutch members. The useful life of conventional fan clutches, and particularly of their thermostatic elements, is shortened by the centrifugal stresses under which they operate, and by other unfavorable conditions inherent in fan operation.

A primary object of the invention is the provision of a thermostatically controlled fan arrangement whose clutch operates reliably over an extended period.

More specifically, the invention aims at a temperature-responsive clutch in which the centrifugal forces acting on sensitive elements are held to a minimum, and in which such elements are protected against mechanical damage.

Another object is the provision of a clutch which operates reliably and sensitively in response to temperature changes even at very high rotary speeds.

A further object is the provision of a clutch which occupies but very little space, and is very light in weight.

With these and other objects in view, as will hereinafter become apparent, the invention in one of its aspects resides in a clutch in which a first and a second clutch member are arranged for rotation relative to each other about a common axis of rotation. The first clutch member has an engageable face which is symmetrical with respect to the common axis. At least one lever is mounted on the second clutch member for rotation therewith about the axis, and for tilting movement relative to the second clutch member, but it is preferred to provide several lever members which are tiltable in respective axially extending planes angularly offset about the axis of rotation. Friction means are operatively connected to the lever or levers for movement toward and away from a position of frictional engagement with the face of the first clutch member during the afore-mentioned tilting movement. The friction means are secured against rotation relative to the second clutch member about the afore-mentioned common axis by the associated levers which provide the only connection between the friction means and the second clutch member.

Tilting movement of the lever or levers is actuated by a thermostat which is mounted on one of the clutch members and includes an actuating member arranged for movement back and forth in the direction of the common axis of the clutch members in response to changes in ambient temperature. Motion is transmitted from the actuating member to the lever or levers for actuating the tilting movement.

Other features and many of the attendant advantages of this invention will be readily appreciated as the same becomes better understood by reference to the following detailed description of preferred embodiments when considered with the attached drawing in which:

FIG. 1 shows a clutch of the invention without its fan and thermostat in an axial end view;
FIG. 2 shows the clutch of FIG. 1 in section on the line II—II, and also includes the fan and thermostat assembly;
FIG. 3 shows a modified clutch of the invention in a view corresponding to that of FIG. 2; and
FIG. 4 is a corresponding view of yet another modified clutch.

Referring now to the drawing in detail, and initially to FIGS. 1 and 2, the driven or input member 1 of the illustrated clutch has the shape of a flat cup having an inner cylindrical face 2. A coaxial pin 3 is integral with the input member 1, and is centered in the cavity of the member 1. The clutch may be driven either by a shaft coaxially attached to the pin 3 or by a belt trained over the outer cylindrical wall.

The driving or output member of the clutch has a hub portion 4 which is rotatably supported on the pin 3 by two juxtaposed ball bearings 5. A retaining ring 6 axially interposed between the bearings and attached to the pin 3, and a retaining ring 7 fastened to the hub portion 4 prevent axial displacement of the two clutch members relative to each other.

Four guide bars 16 integral with the hub portion 4 are equiangularly spaced about the clutch axis. They pass axially through openings in respective two-armed levers 8 of sheet metal. The material removed from the opening in each lever 8 forms an integral lug 9 that projects axially from the remainder of the lever and is attached to the associated guide bar 16 by a pivot pin 10 whose axis is approximately tangential to a circle about the clutch axis and fixed relative to the associated guide bar.

The levers 8 are 90° sectors of a conical dish and therefore combine light weight with high rigidity. The pins 10 are located so as to balance the centrifugal forces which would otherwise tend to tilt each lever 8 on its pin 10 when the driving clutch member rotates. The radially elongated lugs 9 further contribute to the rigidity of the levers.

The peripheral edge of each lever 8 carries a piece 11 of friction material of the type employed in clutch and brake facings which is a segment of a hollow cylinder. The edge of the lever 8 near the clutch axis engages an abutment 13 of axially short, stepped cylindrical shape. A conical coil spring 12 interposed between the central edge portions of the four levers 8 and the abutment 13 biases the friction facings 11 away from the inner face 2 of the driven clutch member 1 by pivoting the levers 8 on their pins 10.

An annular disc 14 and a fan 15 are coaxially attached to the driving clutch member by four bolts 17 which threadedly engage the guide bars 16. The threaded central aperture in the disc 14 receives a hollow plug 18 whose axial position is adjustably secured by a threaded ring 19. The plug 18 retains a thermostat 20 in axially centered position in the driving clutch member. The actuating element 21 of the thermostat engages the abutment 13.

The afore-described apparatus operates as follows:
When the engine connected to the driven clutch member 1 is started cold, the thermostat element 21 is retracted by the fluid which is sealed into the thermostat 20 in the usual manner. The return spring 12 thus can move the central arms of the levers 8 away from the pin 3 and thereby pivot the peripheral lever arms with the attached friction facings 11 away from the cylindrical face 2 of the driven clutch member 1. The clutch is disengaged.

The clutch and fan are normally mounted closely adjacent the engine radiator as is conventional and not shown in the drawing. When the temperature of the water in the radiator exceeds the desired operating temperature, the heat transmitted to the thermostat 20 causes the actuating element 21 to be moved toward the pin 3, thereby swinging the central lever arms against the restraint of the spring 12, and engaging the clutch. The fan 15 is driven until the resulting cooling of the radiator and of its contents, or a change in engine operation again causes the thermostat 20 to switch.

The temperature at which the fan 15 is engaged with the driving engine by the clutch of the invention may be varied to some extent by loosening the ring 19 and threadedly moving the plug 18 in the disc 14.

The fan clutch illustrated in FIG. 3 is closely similar to that described above with reference to FIGS. 1 and 2. It differs from the first embodiment of the invention in the shape of the engaging faces of the two clutch members. The driven clutch member 1' has an inner face 22 which tapers conically toward the driving clutch member. The levers 8' are correspondingly shortened and carry friction facings 11' which are sectors of a conical frustum for conforming engagement with the inner face 22.

The driven member of the clutch shown in FIG. 4, consists of a generally flat metal plate 1" of circular shape which is integral with the pin 3 and carries a light cylindrical shell 24 for protection of the clutch against mechanical damage and for engagement with a non-illustrated drive belt.

The driving member includes four bellcrank levers 8" respectively mounted on guide bars 16'. Each lever 8" has a longer central arm which is held in engagement with the abutment 13 by the spring 12, and a shorter peripheral arm which carries a shoe 23 of friction facing material. The shoes 23 are biased by the spring 12 away from the plate 1", and are engaged by the plate when the thermostat 20 expands.

The embodiments of the invention shown in FIGS. 3 and 4 operate as described with reference to FIGS. 1 and 2. The last described modified fan clutch of the invention is particularly light and can be made very small.

The fan clutches of the invention are durable and dependable. Except for the levers 8, 8', 8" and the associated friction facings, the center of gravity of each clutch element is located in the clutch axis. The levers and friction facings are supported on the pins 10 substantially in their center of inertia so that centrifugal forces have little influence on the levers or facings, and all other clutch elements are not exposed to centrifugal forces which would tend to shift them, to distort them, or to loosen them. The sheet metal levers illustrated are well suited for resisting whatever centrifugal forces may act on them, but it will be appreciated that the invention is not limited to specific materials of construction. The clutch is readily balanced statically and dynamically, and the balance established during manufacture is not altered by normal operating forces.

The sealed thermostat 20 of conventional design is of circular cross section about the clutch axis, and is so close to the axis as not to be subject to significant centrifugal stresses. All sensitive working elements of the clutch are protected against mechanical damage by the generally cup-shaped driven member 1, 1' or the shell 24, the fan 15, and the disc 14.

Because of the balanced suspension of the levers 8, 8', 8" and of the associated friction facings, the force required for engaging and disengaging the clutch is quite small, and may be provided by a small and sensitive thermostat. Sensitivity of operation and durability are not adversely affected by high rotary speed of the fan.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. A temperature responsive fan arrangement for an automotive engine and the like comprising, in combination:
 (a) a driven clutch member having an axis of rotation and defining a cavity therein, said driven clutch member having an engageable face symmetrical with respect to said axis in said cavity;
 (b) bearing means in said cavity;
 (c) a driving clutch member mounted on said bearing means for rotation about said axis;
 (d) a plurality of two-armed lever members mounted on said driving clutch member for tilting movement about respective fixed pivot axes in respective axially extending planes angularly spaced about said axis,
  (1) one arm of each lever member being radially adjacent said axis and axially remote from said engageable face, and
  (2) the other arm of each lever member being radially remote from said axis and axially adjacent said engageable face;
 (e) a friction member mounted on each of said other arms in said cavity for joint tilting movement with the associated lever member toward and away from a position of frictional engagement with said face during said tilting movement of the associated lever member, each lever member constituting the sole means connecting said friction member to said driving clutch member;
 (f) thermostat means including an actuating member axially aligned with said bearing means and mounted on said driving clutch member for axial movement in response to changes in ambient temperature;
 (g) motion transmitting means interposed between said actuating member and said other arms for actuating said tilting movement; and
 (h) a fan mounted on said driving clutch member.
2. A temperature-sensitive clutch for an automotive fan and the like comprising, in combination,
 (a) a first clutch member having an axis of rotation and an engageable face symmetrical with respect to said axis;
 (b) a second clutch member connected to said first member for rotation relative thereto about said axis;
 (c) a plurality of lever members mounted on said second clutch member for rotation therewith about said axis and for tilting movement relative to said second member, said lever members being angularly spaced about said axis of rotation, each lever member being formed with an opening axially extending therethrough;
 (d) a plurality of guide members fixed on said second clutch member and axially passing through said openings respectively;
 (e) friction means operatively connected to one portion of each lever member for movement toward and away from a position of frictional engagement with said face of said first member during said tilting movement of said lever members, said friction means being secured against rotation relative to said second member about said axis;
 (f) thermostat means on one of said clutch members and including an actuating member arranged for movement back and forth in the direction of said axis in response to changes in ambient temperature; and

(g) motion transmitting means connecting said actuating member to another portion of each lever member for actuating said tilting movement.

3. A temperature responsive clutch for an automotive fan and the like comprising in combination:
(a) a first clutch member having an axis of rotation and an engageable face symmetrical with respect to said axis;
(b) a second clutch member connected to said first clutch member for rotation about said axis;
(c) a plurality of lever members mounted on said second clutch member for rotation therewith about said axis of rotation and for tilting movement relative to said second member about respective pivot axes fixed relative to said second clutch member;
(d) friction means secured on one portion of each lever member spaced from the corresponding pivot axis for joint tilting movement with the associated lever member toward and away from a position of frictional engagement with said face of the first clutch member;
(e) thermostat means mounted on one of said clutch members and including an actuating member arranged for axial movement in response to changes in ambient temperature; and
(f) motion transmitting means connecting said actuating member to another portion of each lever member for actuating said tilting movement.

4. A clutch as set forth in claim 3, wherein said lever members constitute the sole means securing said friction means to said second clutch member for joint rotation about said axis of rotation.

5. A clutch as set forth in claim 3, wherein each lever member has two arms respectively constituting said portions thereof, the clutch further comprising pivot means connecting a third portion of each lever member intermediate said arms to said second clutch member for said tilting movement about the corresponding pivot axis, said pivot axis being substantially tangential relative to a circle about said axis of rotation.

6. A clutch as set forth in claim 2, wherein each lever member has the shape of the sector of a dish having a first arm and a second arm, said first arm constituting said one portion of said lever member, and said second arm constituting said other portion of said lever member, and a plurality of pivot means respectively connecting said lever members to said second clutch member for tilting movement of each lever member about an associated pivot axis substantially tangential relative to a circle about said axis of rotation and passing through said pivot means, said friction means including a plurality of friction elements respectively mounted on said second arms.

7. A clutch as set forth in claim 4, wherein each lever member is a two-armed lever, and said lever members are angularly spaced about said axis of rotation, the clutch further comprising a plurality of pivot means, each pivot means securing a corresponding lever member to said second clutch member for said tilting movement, each pivot axis extending in a plane transverse of said axis of rotation.

8. A clutch as set forth in claim 3, wherein said engageable face is of circular cross section in a plane perpendicular to said axis, and said friction means include a friction member mounted on each lever member and shaped for conforming engagement with said face.

9. A clutch as set forth in claim 8, wherein said face is cylindrical.

10. A clutch as set forth in claim 8, wherein said face is conical.

11. A clutch as set forth in claim 3, wherein said engageable face extends radially about said axis of rotation, and said friction means include a plurality of friction shoes respectively mounted on said lever members for said frictional engagement with said face.

12. A clutch as set forth in claim 3, further comprising fastening means for fixedly fastening said second clutch member to a fan.

References Cited

UNITED STATES PATENTS

| | | | |
|---|---|---|---|
| 2,022,709 | 12/1935 | Embery et al. | 170—135.75 X |
| 2,786,456 | 3/1957 | Heiss | 230—271 X |
| 2,811,956 | 11/1957 | Lauck | 123—41.12 |
| 3,103,308 | 9/1963 | Wolfram | 123—41.12 X |
| 3,177,852 | 4/1965 | Elmer | 123—41.12 |

MARTIN P. SCHWADRON, *Primary Examiner.*

EVERETTE A. POWELL, JR., *Examiner.*